United States Patent [19]
Stiles

[11] Patent Number: 5,372,537
[45] Date of Patent: Dec. 13, 1994

[54] APPARATUS AND METHOD FOR ARRANGING ELONGATED FOOD CASINGS ON A SUPPORT

[76] Inventor: Michael F. Stiles, Rte. 1, Box 203 (Portland-Knoxville Rd.), Demossville, Ky. 41033

[21] Appl. No.: 903,706

[22] Filed: Jun. 25, 1992

[51] Int. Cl.$^5$ .............................. A22C 15/00
[52] U.S. Cl. ...................... 452/51; 452/32; 452/186
[58] Field of Search .................. 452/51, 32, 186

[56] References Cited

U.S. PATENT DOCUMENTS

| | | | |
|---|---|---|---|
| 3,694,853 | 10/1972 | Greider | 452/32 |
| 4,339,846 | 7/1982 | Zamiara | 452/51 |
| 4,547,931 | 10/1985 | Staudenrausch et al. | 452/51 |
| 4,644,607 | 2/1987 | Sziede | 452/51 |
| 4,880,105 | 11/1989 | Kasai et al. | 452/51 |

FOREIGN PATENT DOCUMENTS 3437830  4/1986  Germany .................. 452/186

*Primary Examiner*—Willis Little
*Attorney, Agent, or Firm*—Frost & Jacobs

[57] ABSTRACT

A device and method for automatically arranging a flexible casing of food on a support is disclosed. The device includes a rotating barrel assembly having hinged doors which rotate inwardly to reduce the effective perimeter of the barrel assembly. The barrel assembly includes a vacuum port for releasably securing one end of the food casing to the barrel assembly. In operation, the food casing is attached to the barrel assembly, the barrel assembly is rotated and advance laterally along a horizontal support as the food casing is coiled about the barrel assembly. The food casing is deposited on the support by raising the support, moving the doors inwardly, and withdrawing the barrel assembly laterally.

18 Claims, 23 Drawing Sheets

APPARATUS AND METHOD FOR ARRANGING ELONGATED FOOD CASINGS ON A SUPPORT

TECHNICAL FIELD

This invention relates to a machine for arranging a flexible casing of food stuff on a support for subsequent cooking, curing or smoking, and, more particularly, to a machine incorporating a laterally moving rotating barrel assembly to which one end of the casing is secured, and about which the casing may be wrapped in helical fashion as the barrel assembly rotates about the support and advances along the length of the support, and which is capable of depositing the coiled casing on the support as the barrel assembly is retracted to its original position.

BACKGROUND OF THE INVENTION

Sausages and other similar tubular type foods are typically produced by stuffing the food stuff, such as sausage meat, into a flexible elongated casing. In this process, the casing, which may be a natural casing, is closed at one end, such as by tying the end shut, and slipped around a horn shaped extruder which loads the food into the casing. Once the casing is full, the remaining end is closed in an appropriate manner. In many instances, the food is typically cooked, smoked or cured before it is packaged and distributed to the public.

In the case of sausage and similar meats, the length of these tubes of food can be several feet long, typically ranging from 10 to 15 feet. When natural casings are used, the lengths of each casing can vary significantly. In order to cook, smoke cure sausages of such lengths, the sausages are arranged on a horizontal support, commonly known as a stick, in multiple loops. In order to ensure complete and uniform cooking, smoking or curing, the loops of sausage must not touch each other.

Typically, this looping of lengths of sausages is done manually, with the worker holding the entire length of the sausage as he or she wraps it around the stick. The stick is then placed on a conveyor. Typically, another worker then arranges the loops to be equally spaced and roughly equal in length. Usually, the worker is arranging sausages on several moving sticks at one time.

This labor intensive process is not only time consuming, but can cause medical problems and injury to the worker due to the required repetitive movements of the hands and arms. Such problems include a variety of inflammation and swelling problems which can cause pain, weakness, numbness or tingling sensations which are frequently referred to as repetitive stress injuries. Among the more serious repetitive stress injuries is carpal tunnel syndrome, which is a swelling of the nerves at the point where they pass through the wrist.

Due to the medical problems in the meat industry, OSHA is making demands on meat packers to modify their present methods in order to reduce or eliminate these problems. Thus, there is a substantial need for an alternative method of arranging the flexible casings of food stuff, e.g. sausages, on supports which will reduce or eliminate the risk of medical injury to the worker.

DISCLOSURE OF THE INVENTION

It is an object of this invention to provide an apparatus for arranging flexible casings of food stuff on a support which reduces the amount of labor required of the worker.

It is another object of the present invention to provide an apparatus for automatically arranging a length of a flexible casing of food stuff on a support such that it is evenly coiled and evenly spaced.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a device for arranging a flexible casing of food on a support is provided which includes a first member having an axis of rotation, with the first member having a means for releasbly securing a portion of the flexible casing to the member. The device includes a second means for rotating the member about the axis of rotation. Third means are provided for moving the member parallel to a predetermined axis of lateral movement.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIGS. 2014 22 are end views of the barrel assembly with a sausage wrapped thereabout illustrating the progressive steps in the removal of the sausage from the barrel assembly.

Reference will now be made in detail to the present preferred embodiment of the invention, an example of which is illustrated in the accompanying drawings.

DETAILED DESCRIPTION OF THE PREFERRED EMBODIMENT

Figure 1:
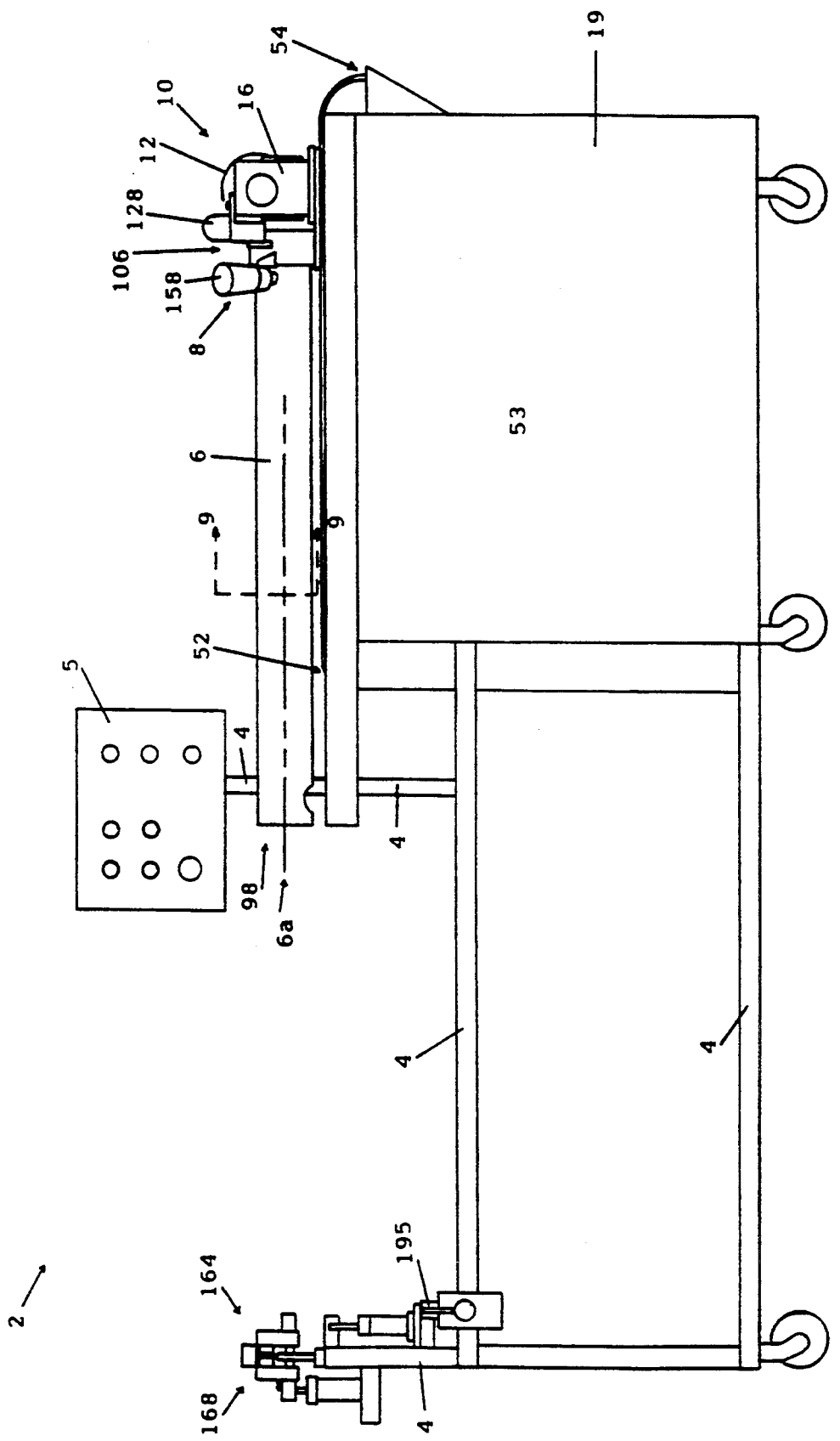
FIG. 1 is a side view of the apparatus of the present invention.
Figure 2:
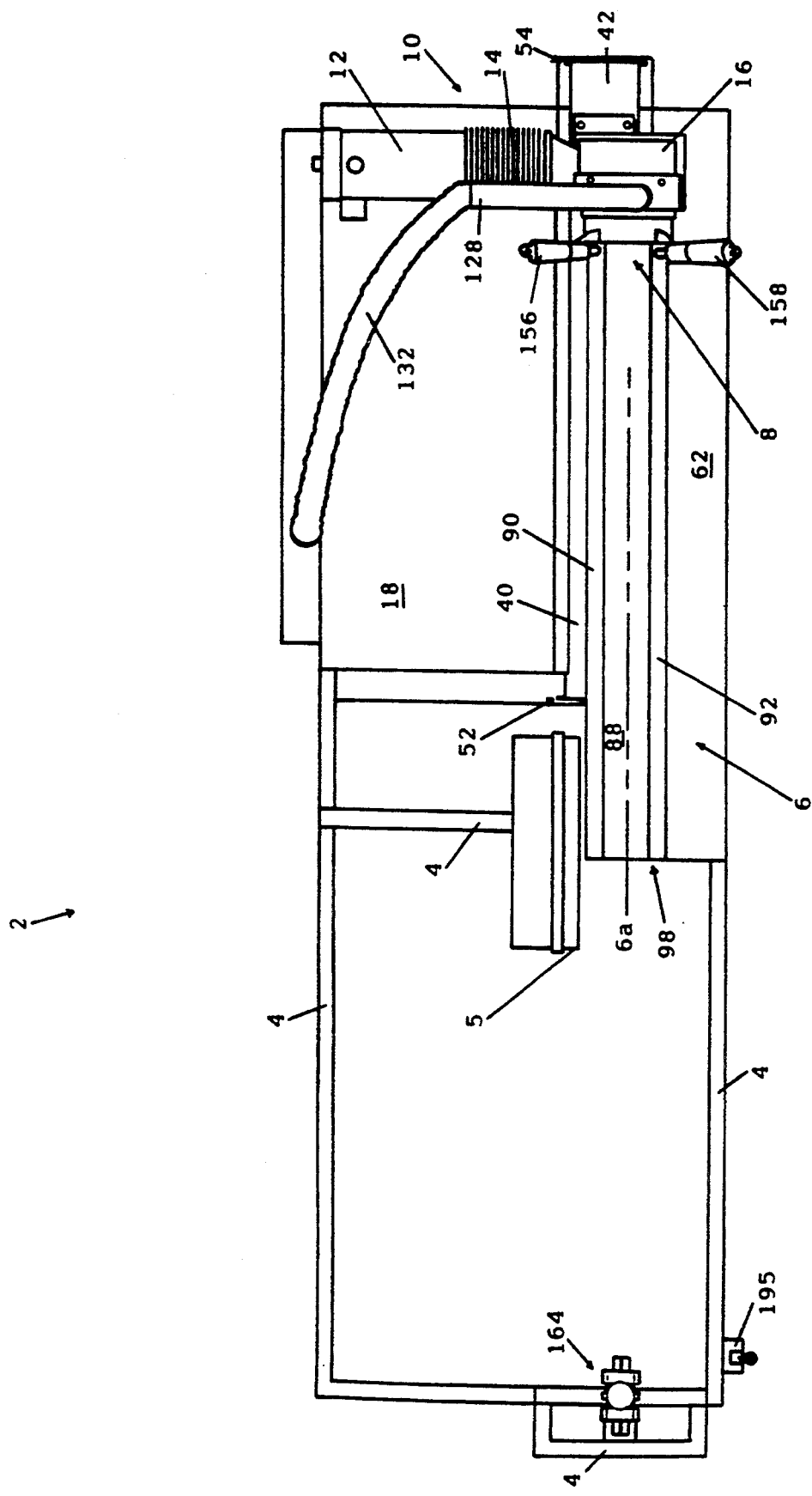
FIG. 2 is a top view of an apparatus constructed according to the present invention.

Referring now to the drawings, FIGS. 1 and 2 illustrate side and plan views of an apparatus constructed according to the present invention. The device, generally designated as 2, includes frame 4 on which the components of device 2 are mounted. Control box 5 is supported by frame 4. Device 2 includes barrel assembly 6 which is rotatable about axis of rotation 6a. Proximal end 8 of barrel assembly 6 is supported and rotationally driven by rotational drive assembly 10. In this embodiment of the present invention, rotational drive assembly 10 includes electric motor 12, which is mounted to brake/clutch assembly 14, right angle drive gear box 16. It is noted that any suitable rotational drive mechanism may be utilized to rotate barrel assembly 6 about axis 6a.

Figure 3:
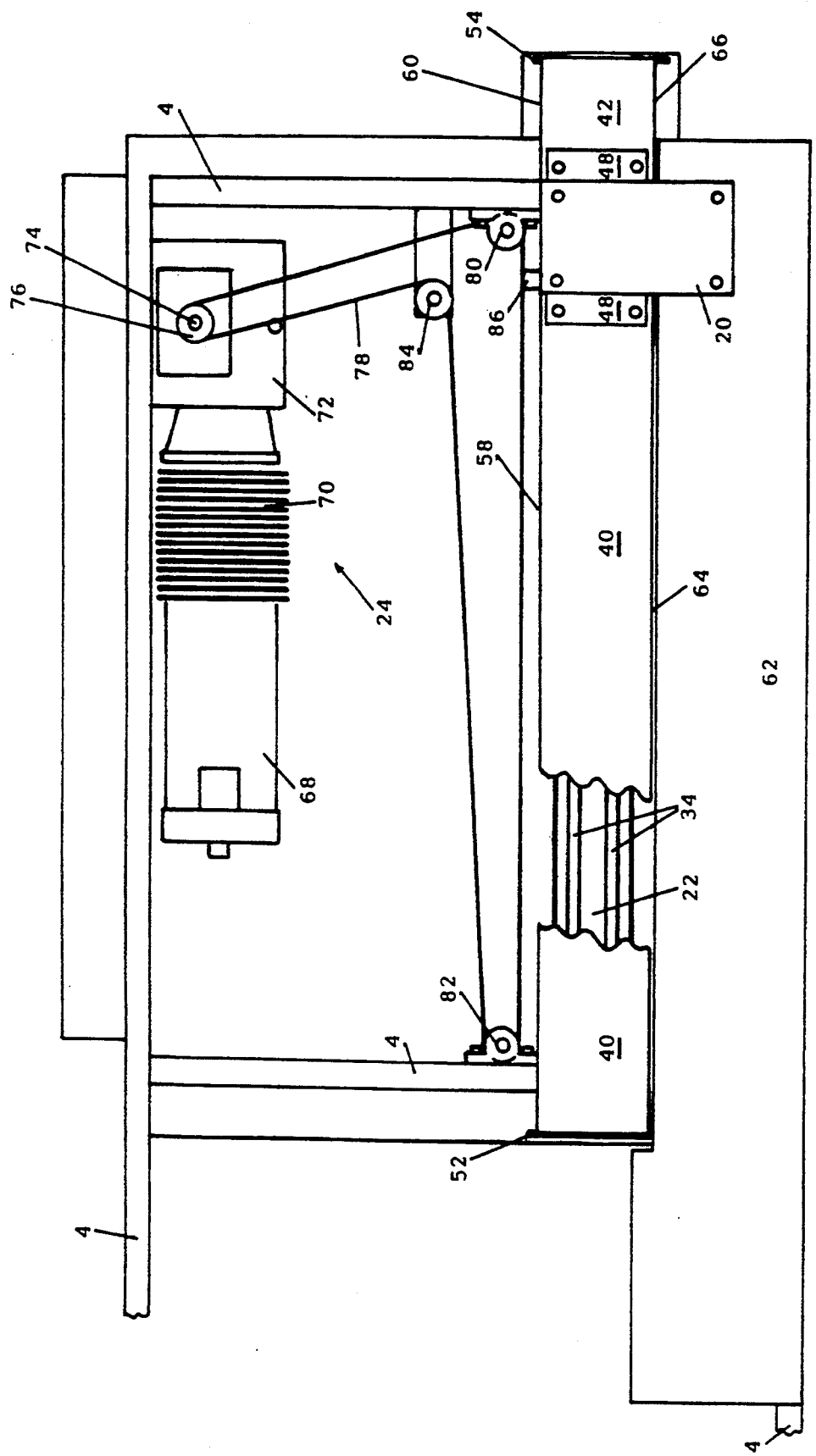
FIG. 3 is a top view of the lateral transport system of an apparatus constructed according to the present invention.
Figure 4:
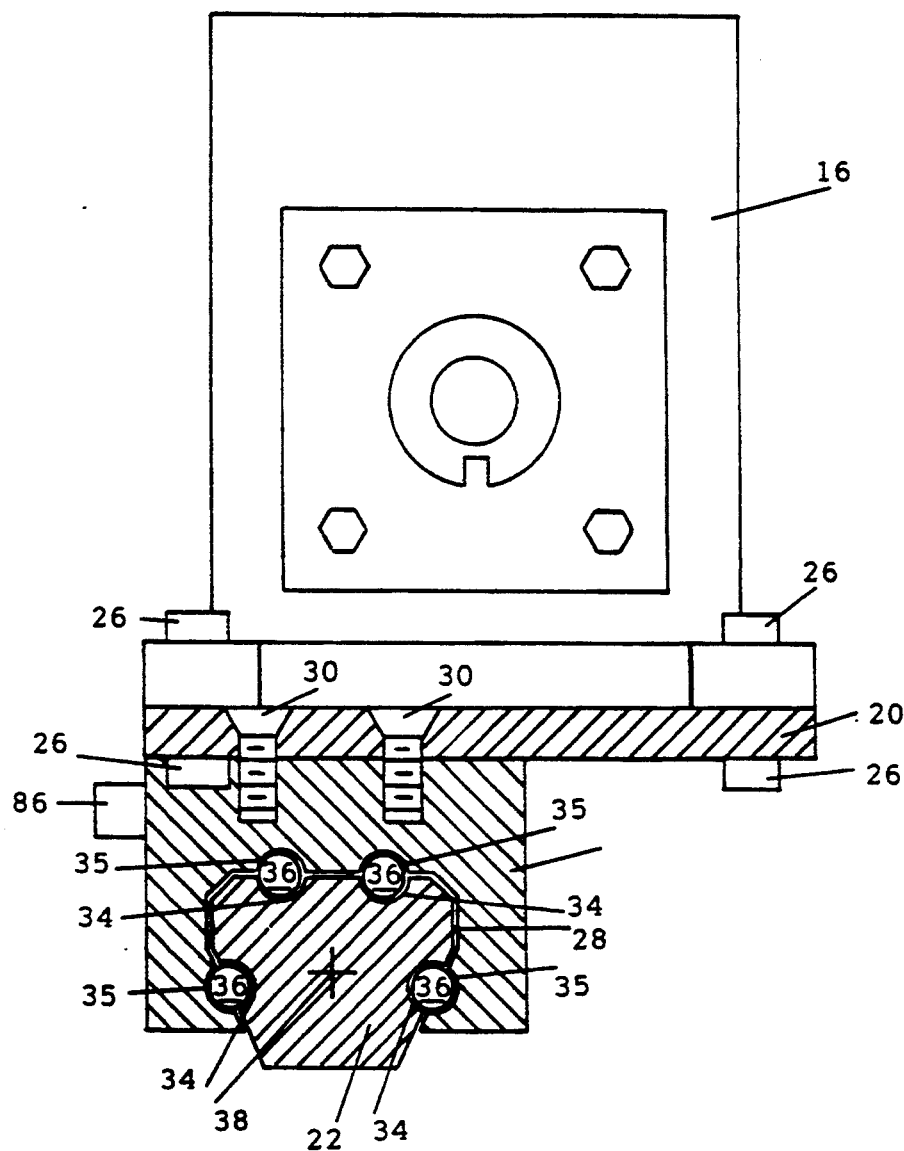
FIG. 4 is a cross-sectional view of the lateral transport guide track.

Barrel assembly 6 and rotational drive assembly 10 are mounted to device 2 so as to be laterally moveable. Referring also to FIG. 3, which is an enlarged, fragmentary top view of device 2 with barrel assembly 6, rotational drive assembly 10 and cover plate 18 omitted, there is shown support plate 20, a portion of guide track 22 and lateral transport drive assembly 24. As best shown in FIG. 4, right angle drive gear box 16 of rotational drive assembly 10 is secured to support plate 20 by fasteners 26. Support plate 20 is secured to shuttle 28 by fasteners 30.

Shuttle 28 includes interior cavity 32 which is shaped complimentary to guide track 22. Shuttle 28 and guide track 22 include a plurality of bearing tracks 34, aligned with a plurality of respective recesses 35. Bearings 36 are interposed between shuttle 28 and guide track 22 to allow shuttle 28 to move along guide track 22, parallel to lateral axis of movement 38 defined by guide track 22. In the preferred embodiment, lateral axis of movement 38 is parallel to axis of rotation 6a.

Figure 5:
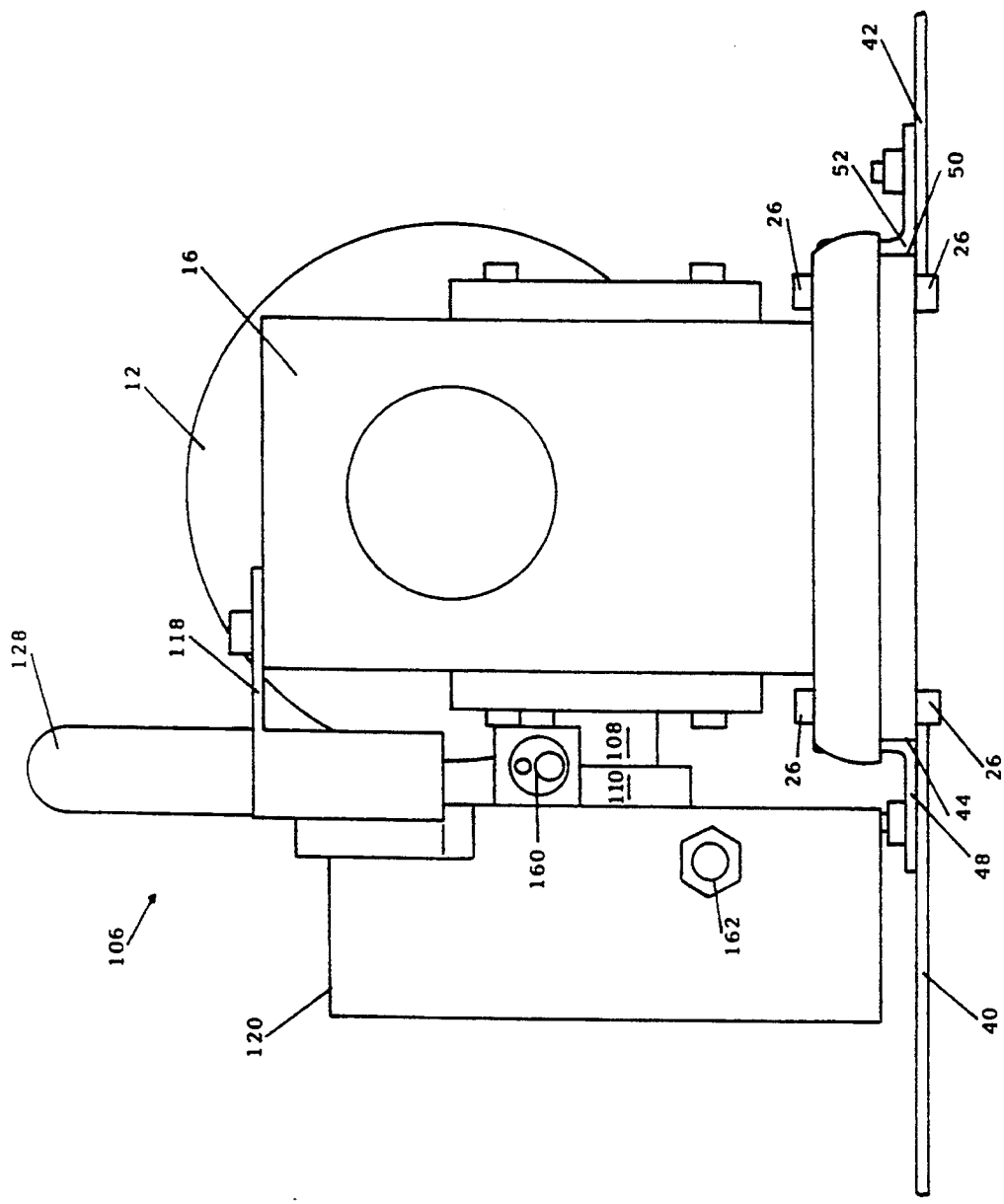
FIG. 5 is a side view of the rotational drive assembly.

Returning to FIG. 3 (and as also shown in FIG. 5), belts 40 and 42 are connected to respective sides 44 and 46 of support plate 20 by brackets 48 and 50. Belts 40 and 42 move with support plate 20, overlying guide track 22, thereby preventing injury to the worker from and contamination of guide track 22. Belts 40 and 42 extend through respective slots 52 and 54 which guide the respective belts to and from a take up and feed area 53 located beneath guide track 22. Although two belts are shown, belts 40 and 42 could be a single continuous belt with any necessary belt guide mechanisms to allow the described belt movement.

Figure 6:
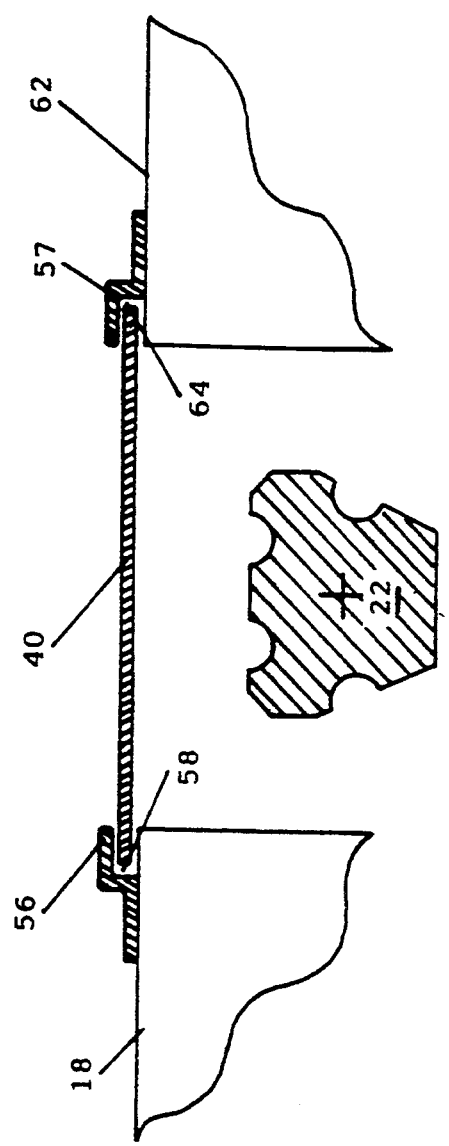
FIG. 6 is an enlarged, fragmentary cross-sectional view of the belt and belt edge guards.

As shown in FIG. 2 and more clearly in FIG. 6, further protection from injury and contamination is provided by belt edge guards 56 which is connected to cover plate 18 and overlie edges 58 and 60 of belts 40 and 42, respectively. Another edge guard 57 is carried by cover plate 62 and overlies edges 64 and 66 of belts 40 and 42, respectively. This second belt edge guard is blocked from view in FIG. 2 by barrel assembly 6. Neither belt edge guard is shown in FIG. 3, for clarity.

As illustrated in the figures, and more specifically shown in FIG. 3, lateral transport drive assembly 24 includes electric motor 68 which is mounted to brake clutch assembly 70 which is mounted to right angle gear drive 72. Output shaft 74 of right angle gear drive 72 is oriented vertically, and includes chain drive sprocket 76. Endless lateral drive chain 78 is routed around idler sprockets 80, 82 and 84. The path of lateral drive chain 78 between idler sprockets 80 and 82 is parallel to guide track 22. Lateral drive chain 78 is connected to shuttle 28 through extension block 86, which takes the place of one half chain link. As illustrated, clockwise rotation of output shaft 74 will cause lateral movement of shuttle 28 and support plate 20 from its lateral home position as illustrated in FIG. 3 toward its extended lateral position at the opposite end of guide track 22. Counterclockwise rotation of output shaft 74 will cause movement in the opposite direction.

Referring to FIGS. 1 and 2, barrel assembly 6 is shown disposed horizontally, extending from rotational drive assembly 10. As shown in greater detail in FIGS. 7, 8 and 9, the outside perimeter of barrel assembly 6 is arcuate, approximately an incomplete circle. In the preferred embodiment, barrel assembly 6 had a diameter of approximately 5¼ inches so that a sausage would hang properly on the support. Barrel assembly 6 includes body 88 and moveable doors 90 and 92, which are pivotably connected to body 88 by a plurality of hinges 94 which are carried by upper surface 95 of body 88. In the preferred embodiment, each door 90, 92 is connected to body 88 by four respective hinges which are approximately equally spaced along the length of body 88. Doors 90 and 92 are urged outwardly by a plurality of springs 96 interposed between some of hinges 94, with sufficient force to prevent doors 90, 92 from closing when a food casing, such as sausage, is wrapped about barrel assembly 6. Alternatively, spring-loaded hinges could be used to pivotably connect doors 90, 92 to body 88. In the preferred embodiment, there are four springs 96 urging door 90 outwardly and three springs 96 urging door 92 outwardly. Thus, a greater force is required to pivot door 90 inwardly than is required to pivot door 92 inwardly. The purpose of this difference is explained below. In the preferred embodiment, respective pairs of springs are located between the first and second hinges 94 of doors 90 and 92, starting from the hinge at proximal end 8. Another pair of springs are located between the second and third hinges of door 90. A single spring is located between the second and third hinges of 92. This is to avoid binding of doors 90 and 92 since the actuators (described below) for doors 90 and 92 are located at proximal end 8.

Figure 11:
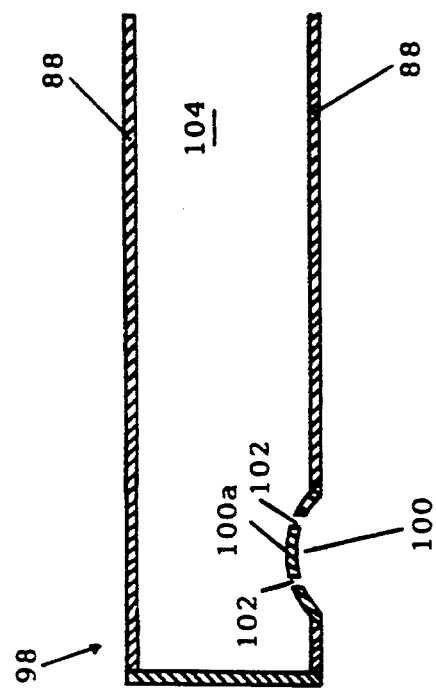
FIG. 11 is a cross-sectional view of the distal end of the barrel assembly taken along line 11—11 of FIG. 10.
Figure 10:
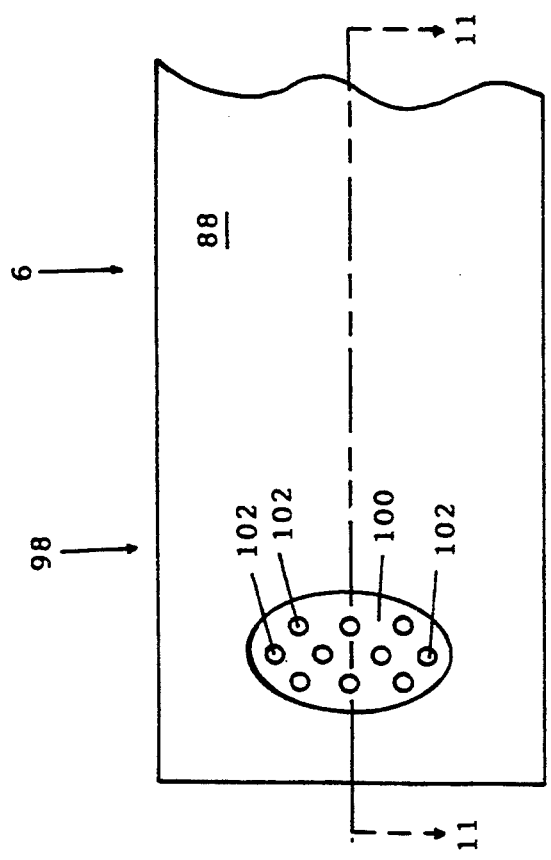
FIG. 10 is a bottom view of the distal end of the barrel assembly showing the vacuum port.

Referring also to FIGS. 10 and 11, distal end 98 of body 88 includes means for releasably securing a portion of the flexible food casing, and in particular, preferably the end portion, to barrel assembly 6. Distal end 98 includes recessed region 100 which has a plurality of apertures 102 which communicate with internal passageway 104 defined by body 88. As will be described below, when a vacuum is present in internal cavity 104, apertures 102 function as vacuum ports and are capable of releasably holding the portion end when it is disposed in recess region 100. As shown in FIG. 11, recessed region 100 has a generally circular shape, which has been selected to cooperate with the generally circular cross-sectional shape of a sausage. To the extent that the two shapes do not conform, there may be some vacuum leakage around the sausage, which can weaken the retention of the sausage to body 88. Such leakage can be accommodated by providing an adequate vacuum source in communication with internal passage 104. Although the apex 100a of recessed region 100 extends chordally across the arcuate shape of body 88 (see FIG. 20), recess portion 100 may be curved in this direction to accommodate stiffness of the sausage.

Figure 7:
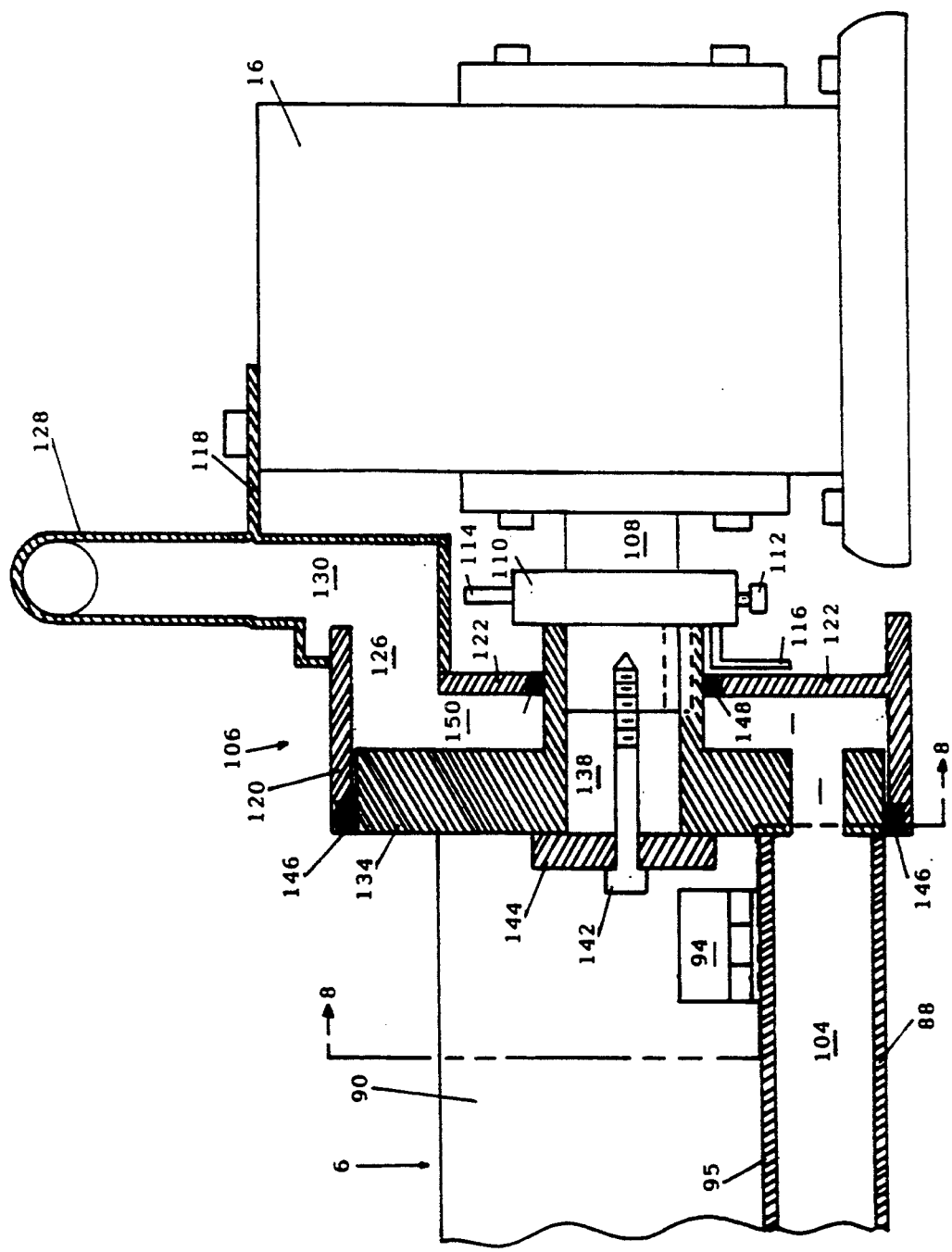
FIG. 7 is an enlarged, fragmentary cross-sectional view showing the vacuum manifold assembly and the connection of the barrel assembly to the rotational drive.

FIG. 7 illustrates the rotational support of barrel assembly 6 and vacuum manifold 106 which places internal passageway 104 in fluid communication with a source of vacuum. Right angle gear drive 16 includes output shaft 108 (not shown in cross section for simplicity) extending horizontally. Collar 110 is non-rotatably carried by shaft 108, being secured thereto by set screw 112. Collar 110 includes position indicators 114 and 116 for use with magnetic proximity pickups 160 and 162.

Vacuum manifold 106 is mounted to right angle gear drive 16 by mounting plate 118. Manifold 106 includes annular hub 120 and transverse web 122. Web 122 includes central aperture 124 which is aligned concentrically with shaft 108, and has a larger inside diameter than the outside diameter of shaft 108. Web 122 also has vacuum passageway 126 formed therethrough. Vacuum inlet housing 128 defines internal vacuum passageway 130 which communicates with vacuum passageway 126. Vacuum inlet housing 128 is connected to flexible vacuum hose 132 (see FIG. 2), which leads to a source of adequate and controllable vacuum. In the preferred embodiment 28. 29½ inches of high volume vacuum was provided.

Proximal end 8 of barrel assembly 6 includes circular flange 134 from which body 88 extends rigidly. Flange 134 includes central hub portion 136 extending therefrom, with aperture 138 formed therethrough. Flange 134 includes vacuum passageway 140 formed therethrough in communication with internal passageway 104.

As FIG. 7 illustrates, shaft 108 extends into aperture 138 with central hub portion 136 extending through aperture 124, abutting collar 110. Barrel assembly 6 is secured to shaft 108 by fastener 142 which is threaded into shaft 108, and washer 144. Shaft 108 is keyed to flange 134 by key 145.

Seal 146 seals between circular flange 134 and annular hub 120, and seal 148 seals between web 122 and central hub portion 136, thusly forming internal annular cavity 150. Internal passageway 104 is thusly placed in fluid communication with a source of vacuum through vacuum passageway 140, internal annular cavity 150, vacuum passageway 126, internal vacuum passageway 130 and vacuum hose 132.

Figure 8:
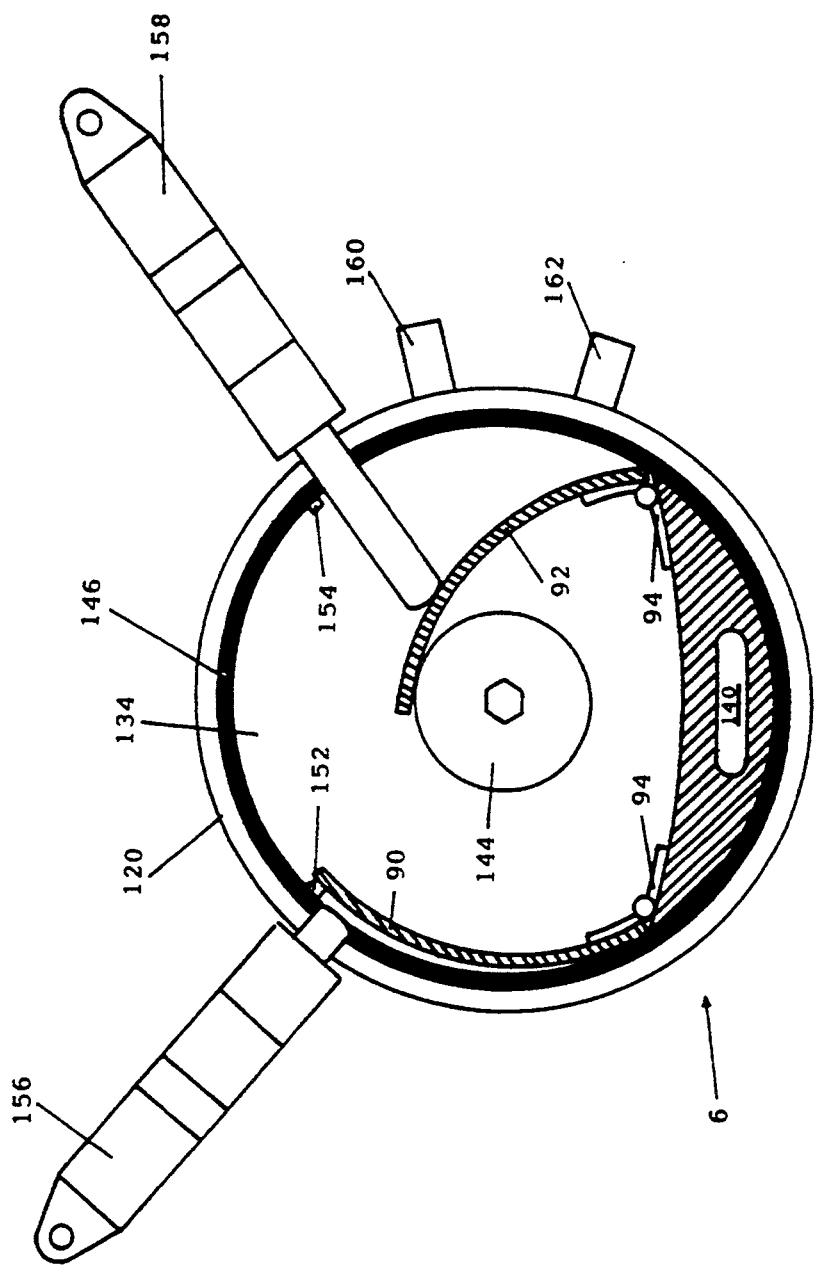
FIG. 8 is a partial cross-sectional end view of the barrel assembly taken along line 8—8 of FIG. 7.
Figure 9:
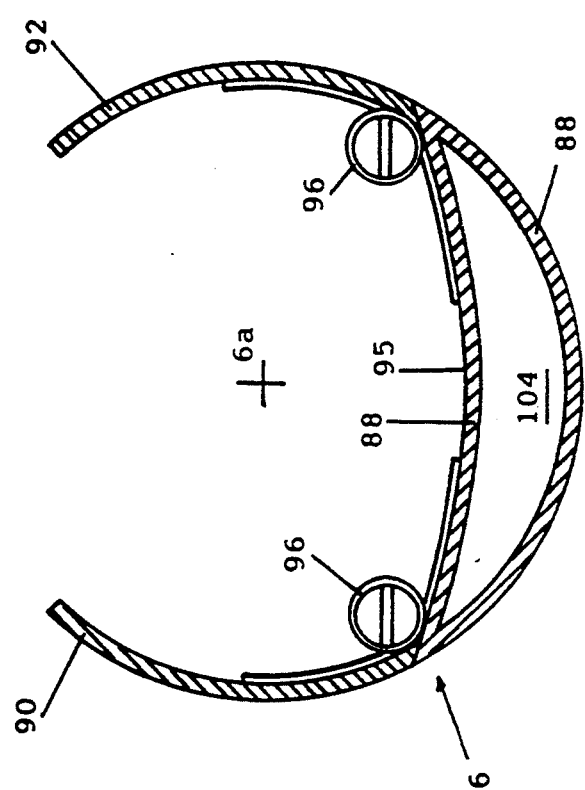
FIG. 9 is a cross-sectional view of the barrel assembly taken along line 9—9 of FIG. 1.

Referring now to FIG. 8, means for reducing the effective perimeter of barrel assembly 6 are illustrated. As previously mentioned, the perimeter of barrel assembly 6 when doors 90 and 92 are in their normal, fully open position, approximates that of an incomplete circle. Stop blocks 152, 154 restrain doors 90 and 92, respectively, in their normal, full open position, preventing outward rotation of doors 90 and 92 while allowing inward rotation. Actuators 156 and 158 are supported by vacuum manifold 106 (see FIG. 2) and are oriented such that their respective plungers 156a, 158a may be extended when barrel assembly 6 is in its rotational home position and cause doors 90, 92, respectively, to rotate inwardly, thereby reducing the effective perimeter of barrel assembly 6. Door 92 is shown the retracted position. The length of plunger 158a is such that door 92 will rest against washer 154 its full inward rotation. Since door 90 has more spring force urging it outwardly, and since actuators 156 and 158 exert nearly identical forces against their respective doors, door 90 will be "stiffer" and take longer to rotate inwardly. Since doors 90 and 92 are long enough to overlap at their full inward rotation, the additional stiffness of door 90 causes its inward movement to take longer, thereby preventing the edges of doors 90, 92 from abutting each other and blocking full inward rotation.

In the preferred embodiment, actuators 156 and 158 are pneumatic, each having a 2½ inch stroke, a 1 inch bore and operating at 95 psi, although any suitable actuator may be used. The cross-sectional shape of barrel assembly 6 can be of any configuration and construction so long as there are means for reducing the effective perimeter of barrel assembly 6 to allow removal of a food casing coiled about barrel assembly 6 as described below.

FIG. 8 also illustrates proximity pickups 160 and 162, which cooperate with indicators 114, 116, respectively, to indicate the rotational position of barrel assembly 6. Proximity pickup 160 is used to indicate the rotational home position of barrel assembly 6, as shown in FIG. 8, with recessed region 100 being oriented downwardly.

Figure 12:
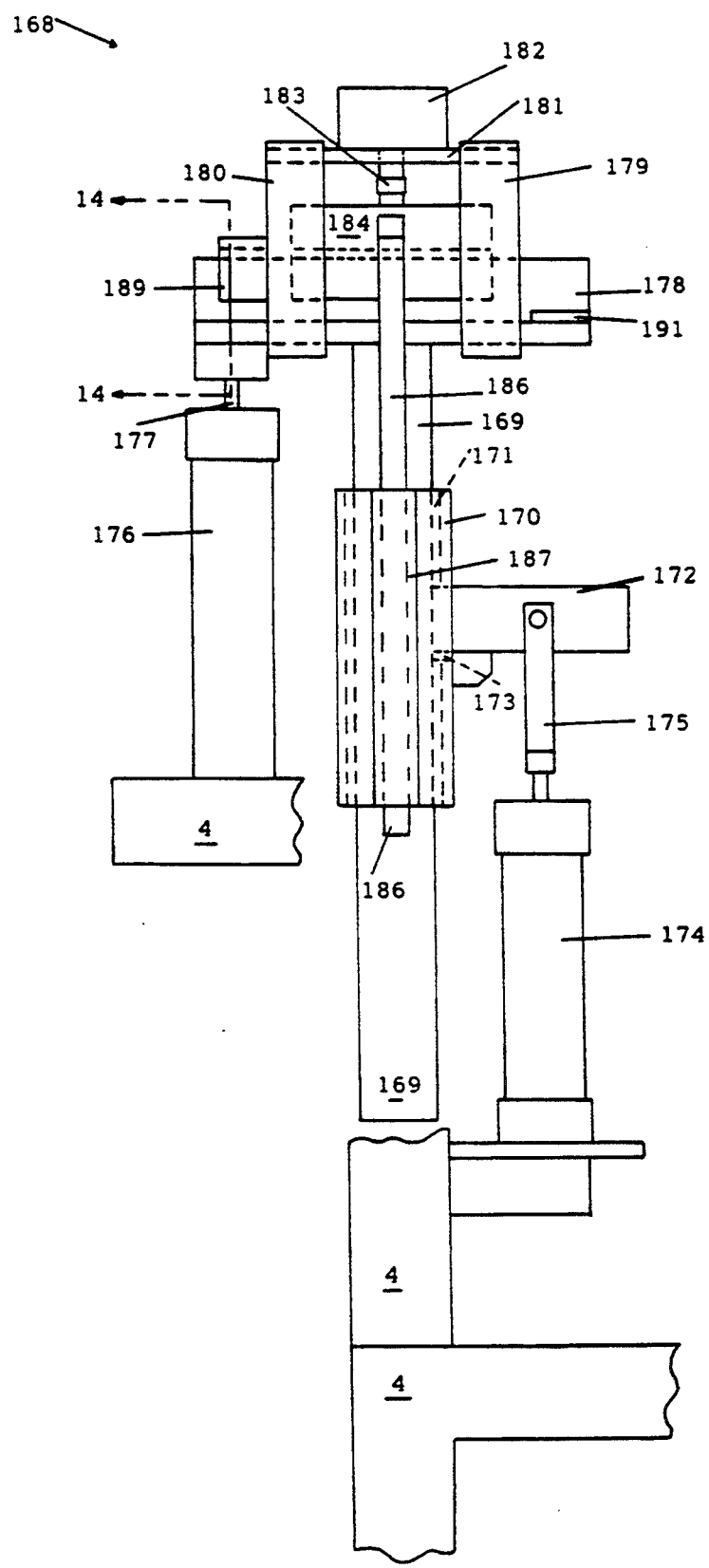
FIG. 12 is an enlarged, fragmentary side view of the mechanism for holding and vertically moving the support.
Figure 13:
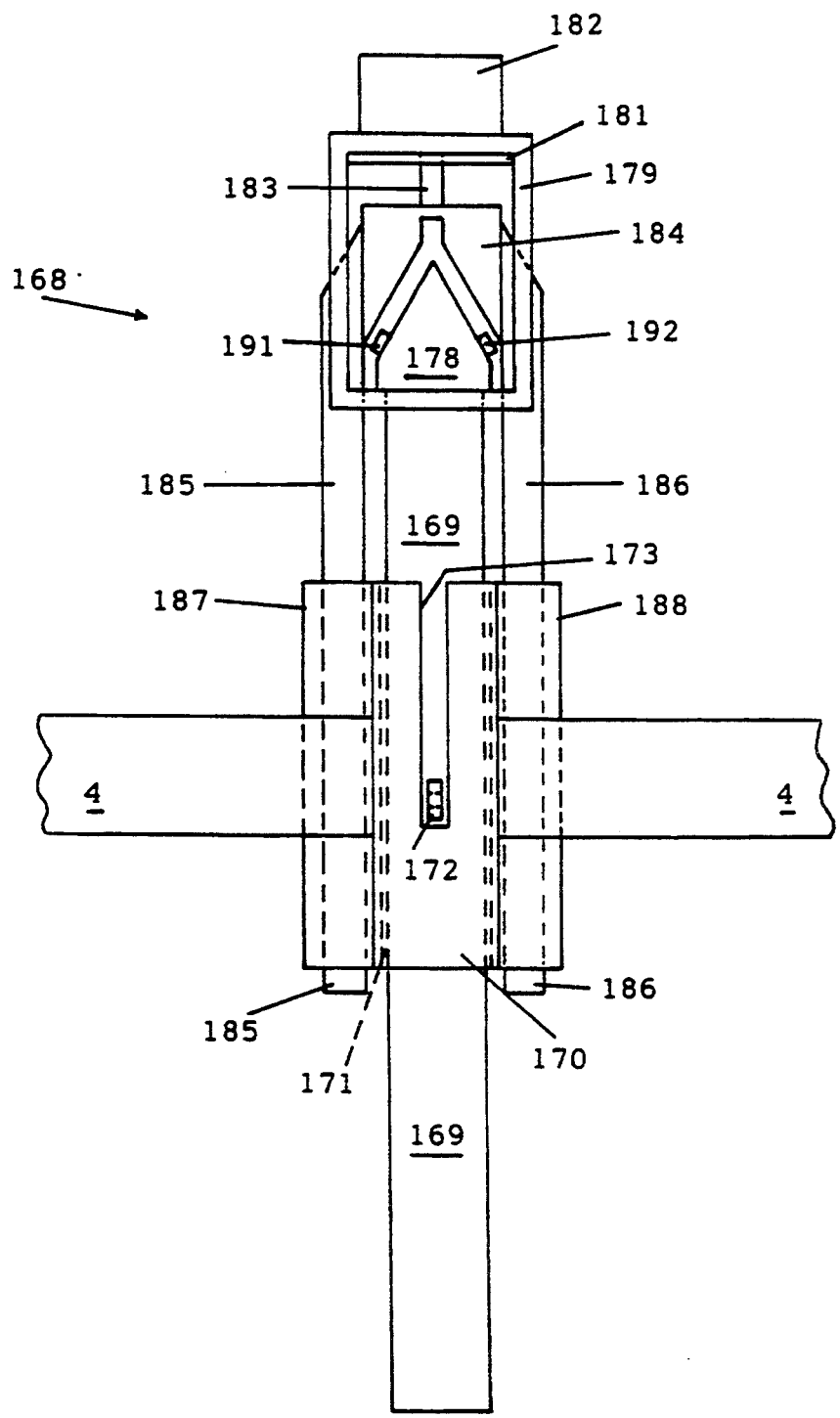
FIG. 13 is an enlarged fragmentary end view the mechanism for holding and vertically moving the support.

Returning to FIGS. 1 and 2, the mechanism for holding and vertically moving the support (not shown) is indicated generally at 164. Referring to FIGS. 12 and 13, which are enlarged, fragmentary side and end views, respectively, of mechanism 164, mechanism 164 includes clamp assembly 168 rigidly mounted atop vertically moveable shaft 169. Shaft 169 is slidably carried by sleeve 170 which is rigidly connected to frame 4 (see FIG. 13; actuator 174 is omitted for clarity). Bushing 171 is provided between shaft 169 and sleeve 170 to reduce the sliding friction therebetween. Arm 172 extends perpendicularly from shaft 169 through slot 173 formed through sleeve 170 and bushing 171, and prevents rotation of shaft 169. Pneumatic actuator 174 is connected to arm 172 through piston 175, and is disposed to move shaft 169 vertically upon extension and retraction of piston 175. Pneumatic actuator 174 is supported at its base by frame 4. In the preferred embodiment, this travel is approximately 2 inches.

A second pneumatic actuator 176, supported at its base by frame 4, is connected to clamp assembly 168 by rod 177, and is also utilized to move clamp assembly 168 vertically. The location of second pneumatic actuator 176 provides additional support to counteract the cantilevered effect when support 166 (not shown) is supporting a sausage and is held by clamp assembly 168.

As should be understood, many different configurations may be used to move clamp assembly 168 vertically. For example, it may be possible to omit second pneumatic actuator 176. It may also be possible to use a single coaxial actuator which is connected directly to clamp assembly 168. In such a case, means must be provided to prevent clamp assembly 168 from rotating relative to frame 4.

Clamp assembly 168 includes V-shaped block 178 which is mounted directly atop shaft 169. Brackets 179 and 180, having a rectangular shape as shown in FIG. 13, are connected to the bottom of block 178. Mounting plate 181 is secured to the upper ends of brackets 179 and 180 as shown. Pneumatic actuator 182 is mounted atop mounting plate 181, with piston 183 extending downwardly through a hole in mounting plate 181. V-shaped clamp 184 is connected to piston 183, and is thereby moveable vertically relative to brackets 179 and 180. By manually controlling valve 195 (FIGS. 1 and 2), pneumatic actuator 182 can be energized to move clamp 184 toward block 178. Guides 185 and 186 are secured at their upper ends to clamp 184, extending downwardly therefrom through respective sleeves 187 and 188 disposed on either side of sleeve 170. Guides 185 and 186 function to prevent clamp 184 from turning relative to block 178. It noted that it may be possible to omit guides 185 and 186 so long as means are provided to prevent relative rotation and misalignment between clamp 184 and block 178, for example the spacing between clamp 184 and the respective spaced apart uprights of each bracket 179 and 180.

Figure 14:
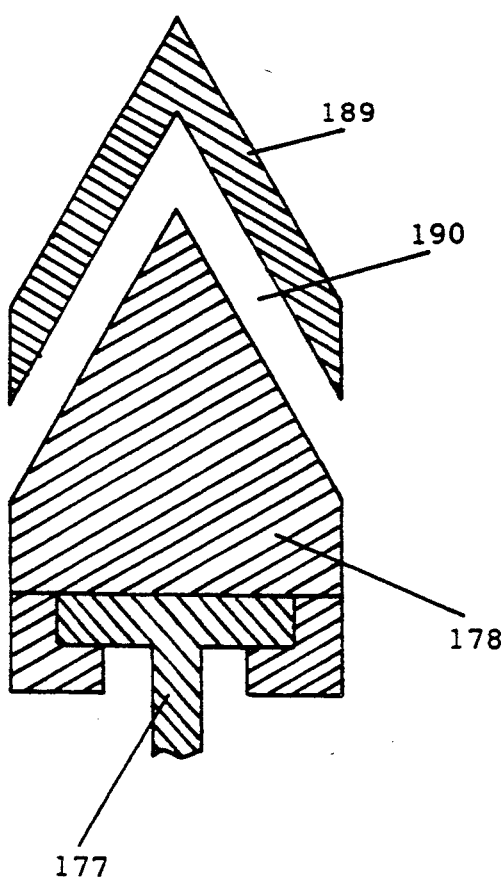
FIG. 14 is an enlarged fragmentary cross-sectional view taken along line 14—14 of FIG. 12.

Referring to FIG. 14, an enlarged, fragmentary cross-sectional view taken along line 14—14 of FIG. 12 is illustrated. Retaining strap 189 is connected to block 178 adjacent one end. Strap 189 extends about the upper periphery of block 178, having a generally complimentary V-shape, and thereby creating a generally V-shaped space 190 between strap 189 and block 178.

Figure 15:
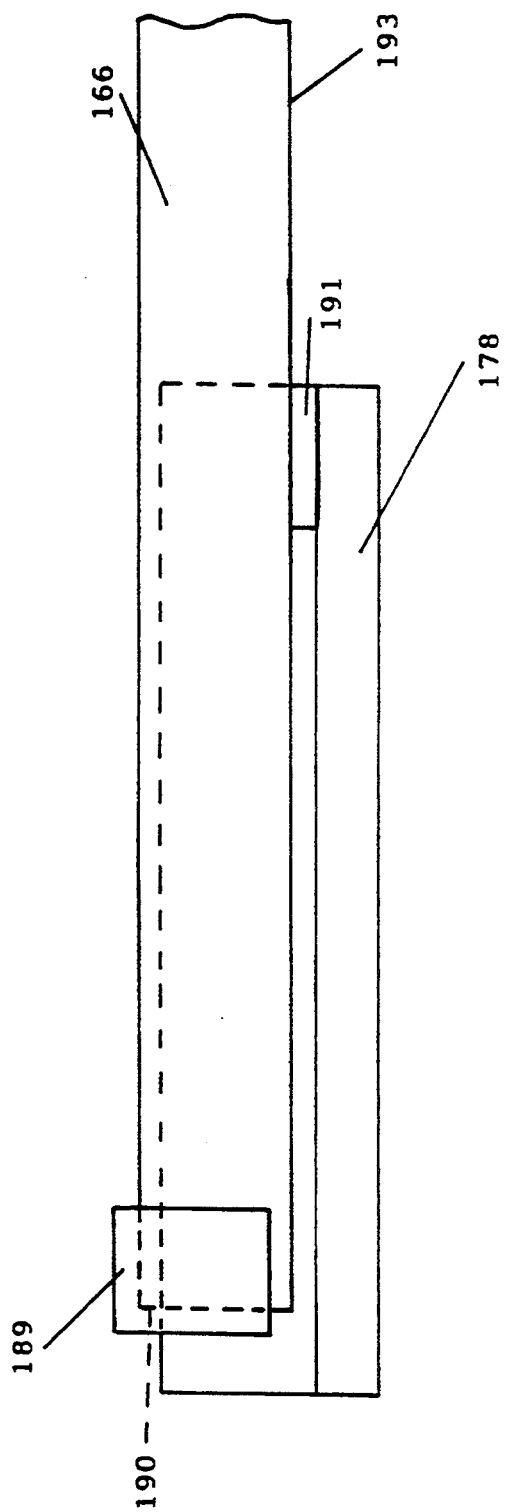
FIG. 15 is an enlarged, fragmentary side view showing the V-shaped block with a support disposed on top.
Figure 16:
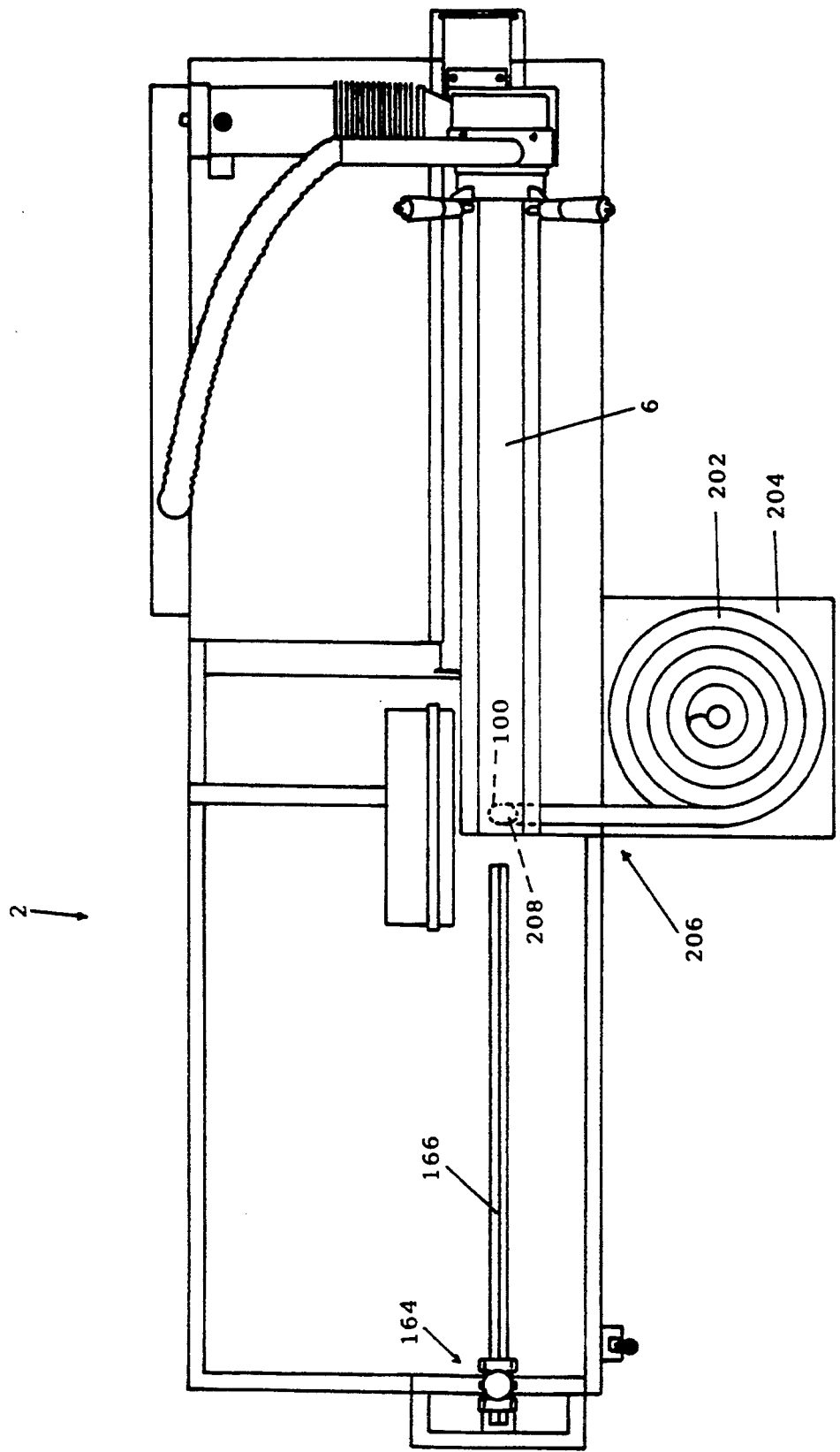
FIGS. 16–19 are top views of the apparatus of the present invention illustrating a flexible casing of food, in particular sausage, being wrapped around the barrel assembly, at progressive stages of the process.
Figure 17:
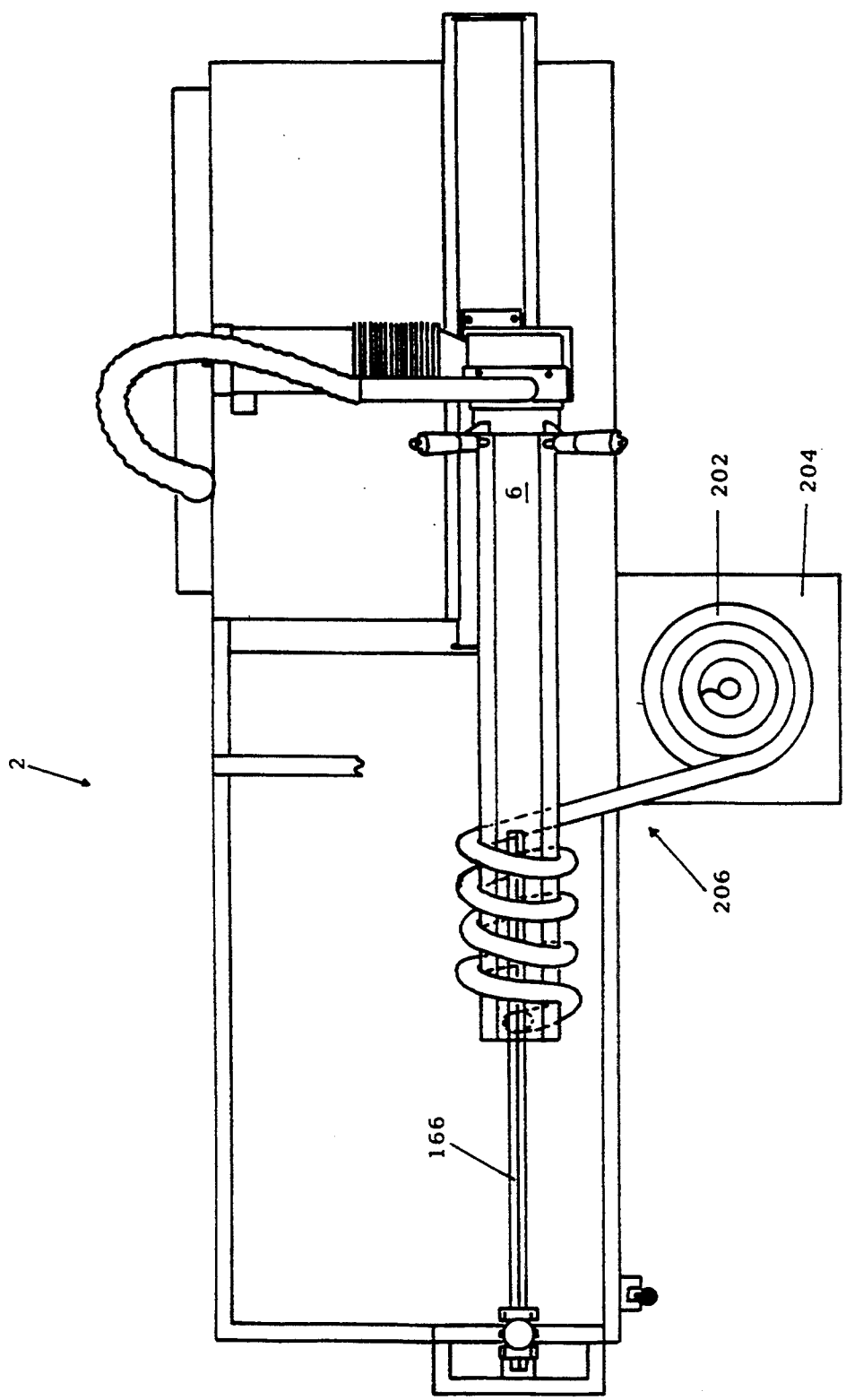

Referring also to FIG. 15, which illustrates V-shaped block 178 with support 166 located thereon, one end of support 166 is inserted into V-shaped space 190 as shown. At the opposite end of block 178, supports 191 and 192 are carried by block 178, and support lower edge 193 of support 166. To clamp support 166 securely to block 178, pneumatic actuator 182 is extended0 causing clamp 184 to clamp against support 166.

Referring now to FIGS. 16–19, device 2 is illustrated at various stages of loading the flexible food casing illustrated as a or sausage onto support 166. Sausage 202 is shown coiled and placed atop table 204 which is positioned at work station 206. End portion 208 of sausage 202 is located by the operator in recessed region 100 such that end portion 208 is releasably secured to barrel assembly 6 by the vacuum which is present throughout operation of device 2, except when interrupted by the computer control to release end portion 208. The cycle for this process is started by the operator depressing a foot switch (not shown) which is connected to the programmable logic controller (PLC) (not shown) which is housed behind front panel 19 (see FIG. 1). Barrel assembly 6 is caused to rotate about its axis of rotation 6a and is transported laterally by lateral transport drive assembly 24 so as to move barrel assembly 6 laterally relative to work station 206. As barrel assembly 6 rotates and advances laterally, the operator guides sausage 202 so as to coil it about barrel assembly 6, with the coils about 1 inch apart. As barrel assembly 6 advances laterally, it moves relative to support 166, which is disposed at a position within of the effective perimeter of barrel assembly 6, and so as not to contact doors 90, 92, nor body 88, thereby allowing rotation of barrel assembly 6 about support 166. In the preferred embodiment, support 166 is generally aligned with axis of rotation 6a.

Figure 18:
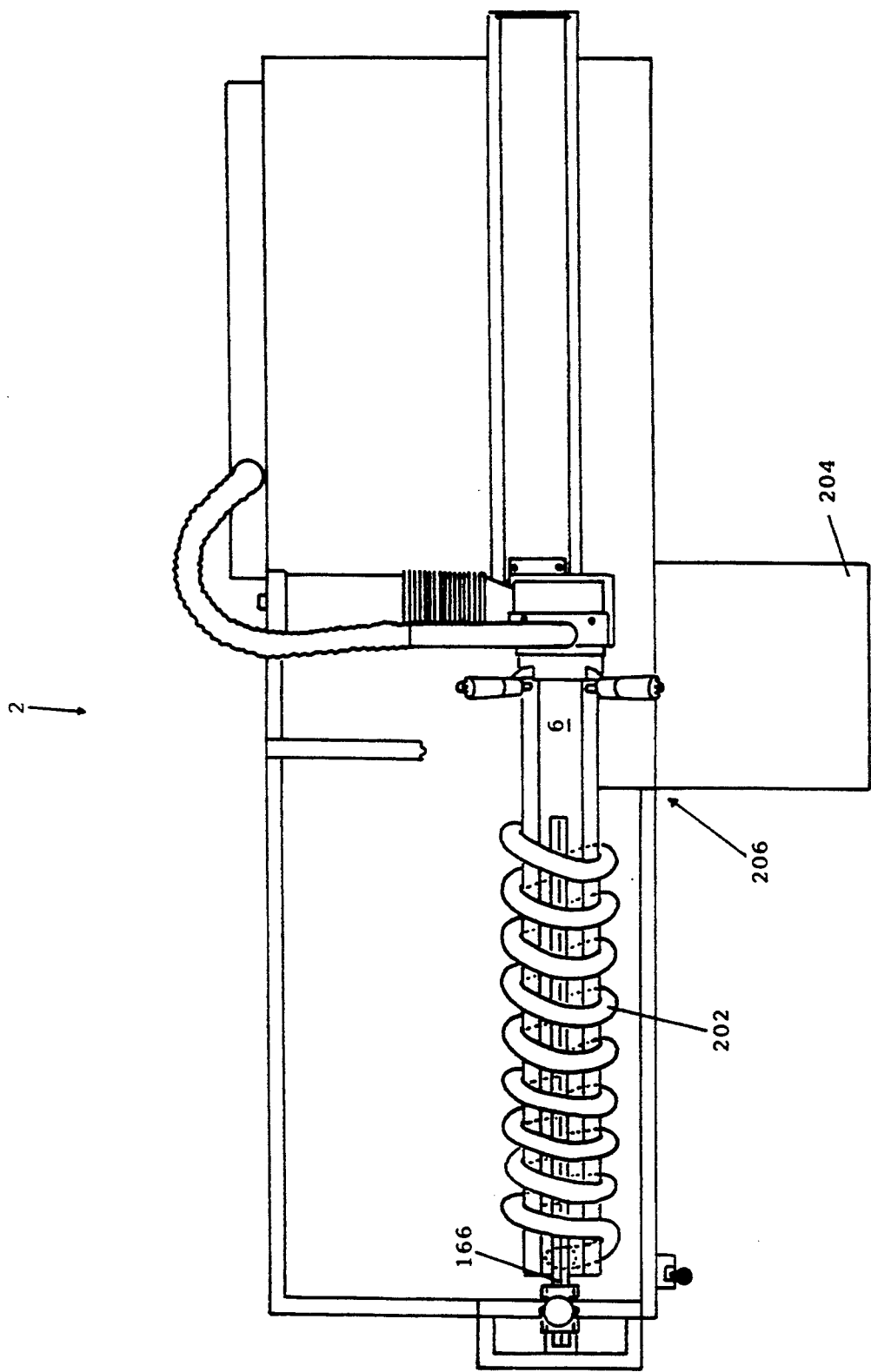
Figure 19:
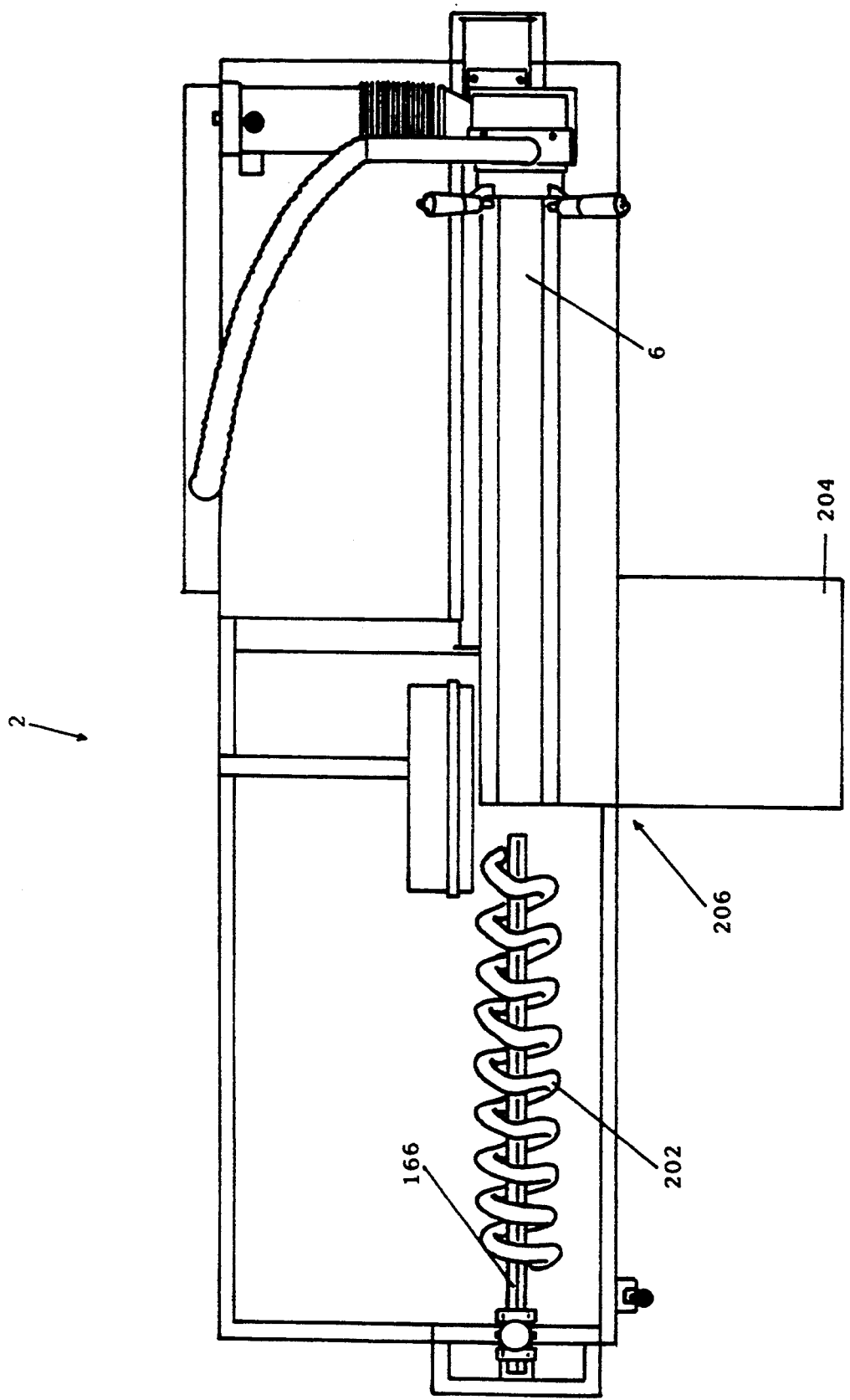

FIG. 18 illustrates sausage 202 completely coiled about barrel assembly 6, with barrel assembly 6 being stopped at its rotational home position. Barrel assembly 6 has been transported laterally to position where all of the loops of sausage 202 overly support 166. As will also be discussed below, mechanism 164 then raises support 166 into engagement with the sausage 202 and to a position outside of the effective perimeter of barrel assembly 6. The vacuum is interrupted, releasing end portion 208, and actuators 156 and 158 are energized to move doors 90 and 92 inwardly thereby reducing the effectively perimeter of barrel assembly 6. Barrel assembly 6 is then laterally transported in the opposite direction back to its original lateral home position, as shown in FIG. 15, leaving sausage 202 fully supported by support 166. At this point in the process, clamp assembly 168 is released manually and support 166 is removed by the operator and taken for subsequent processing, such as to cook, smoke or cure. The present process is repeated with a new sausage by installing another support in clamp assembly 168 and repeating the process just described.

Figure 20:
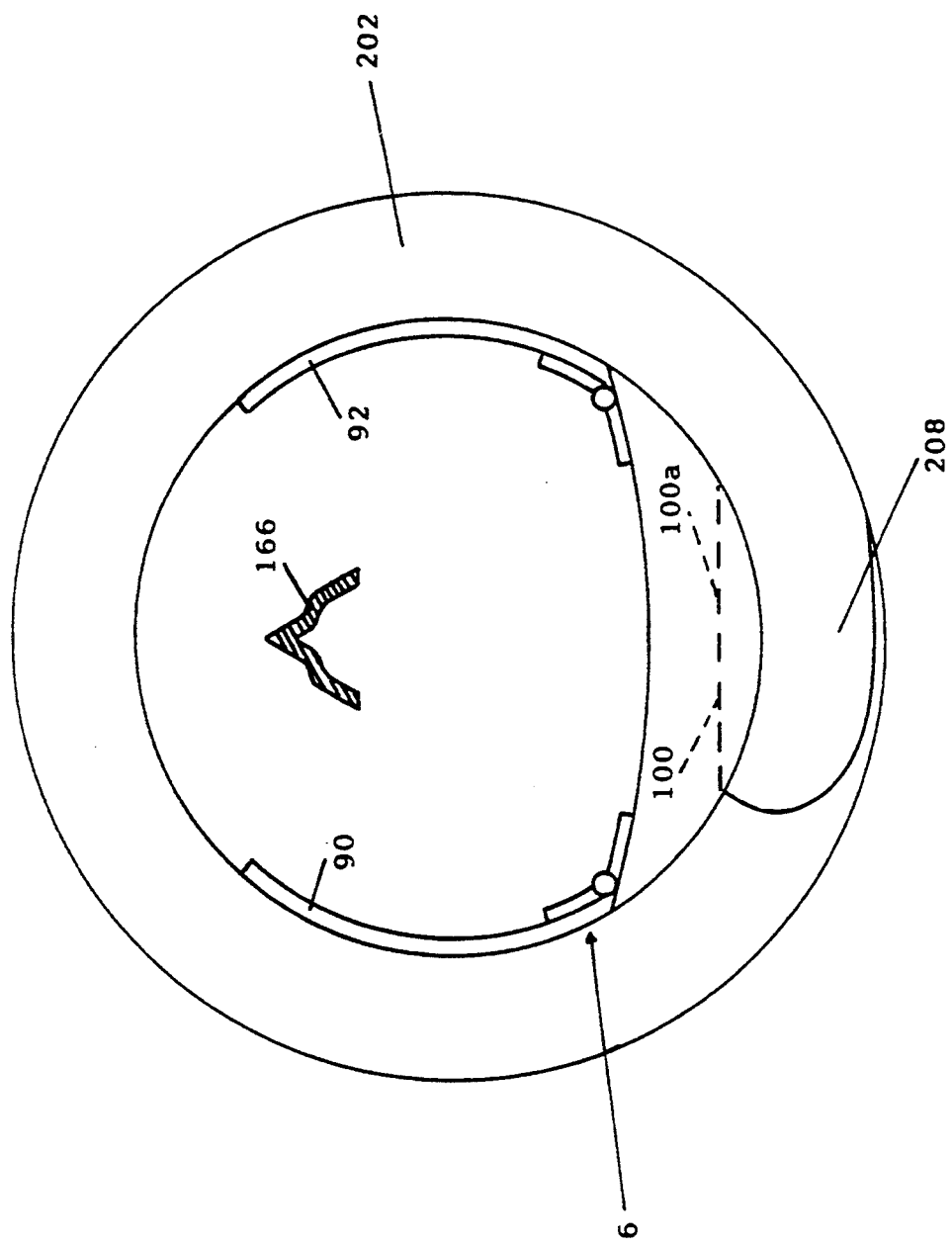

Referring now to FIGS. 20–23, end views of the movement of support 166 and subsequent removal of sausage 202 from barrel assembly 6 are illustrated. FIG. 20 shows sausage 202 coiled about barrel assembly 6 with support 166 being disposed within the the effective perimeter of barrel assembly 6. FIG. 20 is essentially an end view of the sausage in the position shown in FIG. 18. End portion 208 is releasably secured to barrel assembly 6 at recessed region 100 by operation of the vacuum system. As previously noted, in the preferred embodiment, recessed region 100 has apex 100a which is straight. Alternatively, apex 100a could be arcuate to help accommodate stiffer sausages or other food casings. The effective perimeter of barrel assembly 6 is defined by the path followed by sausage 202 (for any food casing) when wrapped around and supported only by barrel assembly 6. It is noted that depending upon the stiffness of sausage 202, it may follow an arcuate path between the end of doors 90 and 92, or may in fact sag somewhat therebetween. If sausage 202 is stretched tightly about barrel assembly 6, sausage 202 may take a straighter path between the ends of doors 90 and 92.

Figure 21:
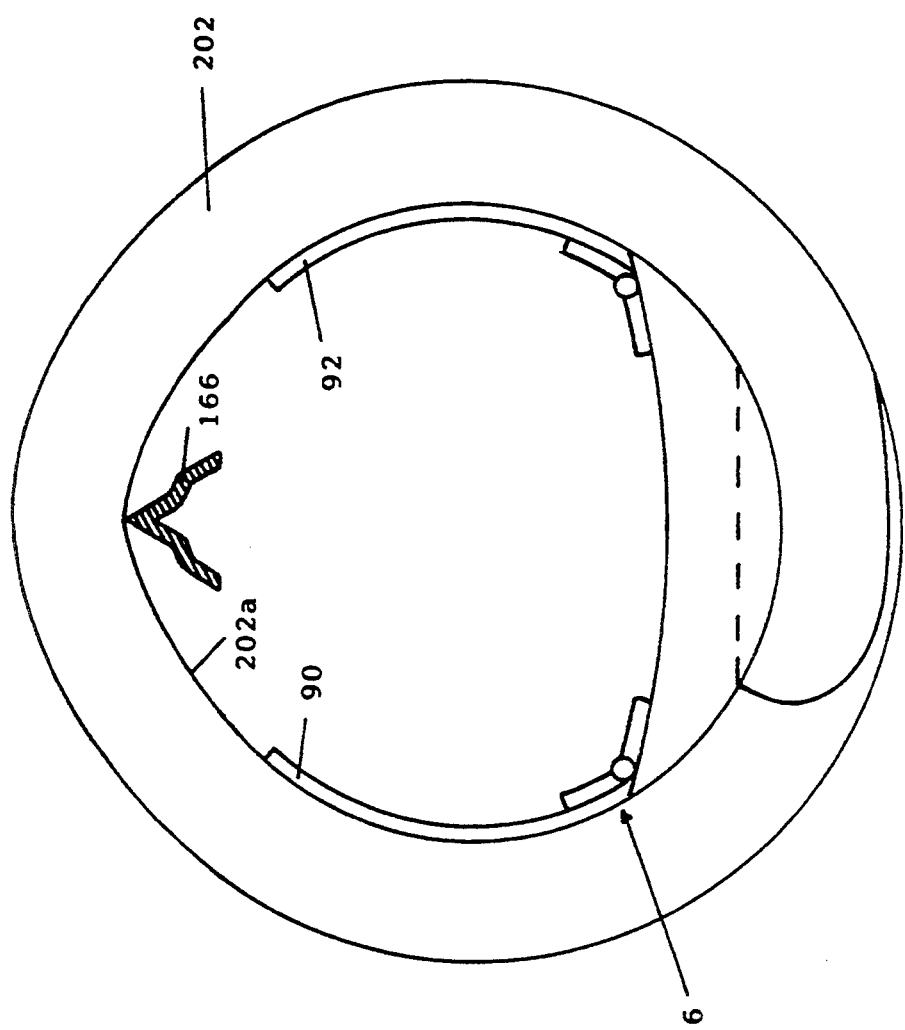

As shown in FIG. 21, support 166 has been moved vertically, about 2 inches in the preferred embodiment, to a location where it engages the lower surfaces 202a of the loops of sausage 202. At this position, support 166 is extended at least partially outside of the perimeter of barrel assembly 6, and has lifted the upper portion of the loops of sausage 202 above their unsupported positions, thereby somewhat stretching sausage 202.

Figure 22:
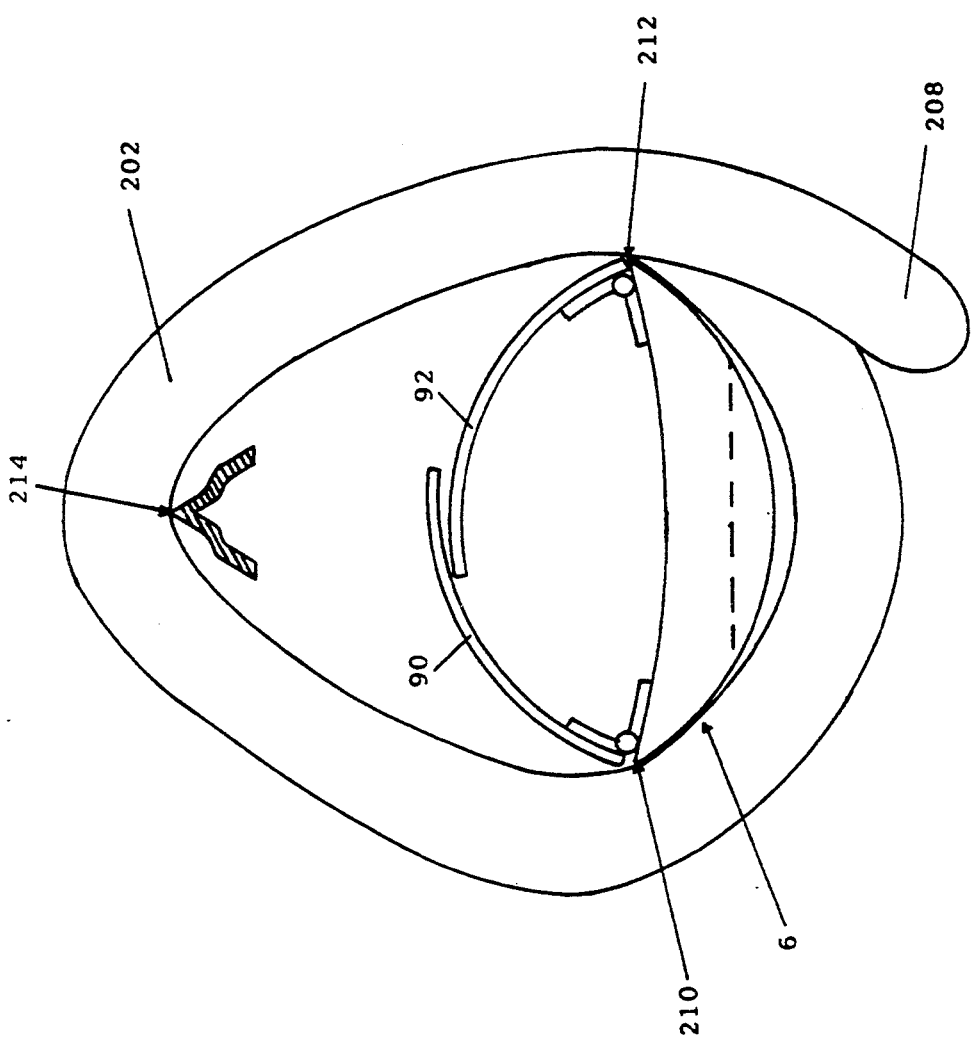

FIG. 22 illustrates doors 90 and 92 in the retracted position, thereby reducing the effective perimeter of barrel assembly 6. End portion 208 has been released from barrel assembly 6 by interrupting the vacuum. In this position, the loops of sausage 208 touch barrel assembly 6 essentially only at two locations on either side of body 88, generally identified as 210 and 212, having approximately a one quarter to one eighth inch gap between the bottom of body 88 and the loops of sausage 202. The tighter that sausage 202 is wrapped around barrel assembly 6, the greater the drag or friction at locations 210 and 212. As barrel assembly 6 is withdrawn laterally from the loops of sausage 202 (i.e. moved laterally relative to support 166), the total friction between the loops of sausage 202 at locations 210 and 212 is less than the friction between the loops of sausage 202 and support 166 at location 214. As a result of the difference in friction, sausage 202 remains on support 166 as barrel assembly 6 is withdrawn.

The speed of withdrawal of barrel assembly 6 is selected based on the amount of the retaining drag or friction between barrel assembly 6 and sausage 202 relative to the amount of drag or friction between sausage 202 and support 166. Basically, the greater the friction between sausage 202 and barrel assembly 6, the slower the rate of withdrawal of barrel assembly 6.

Figure 23:
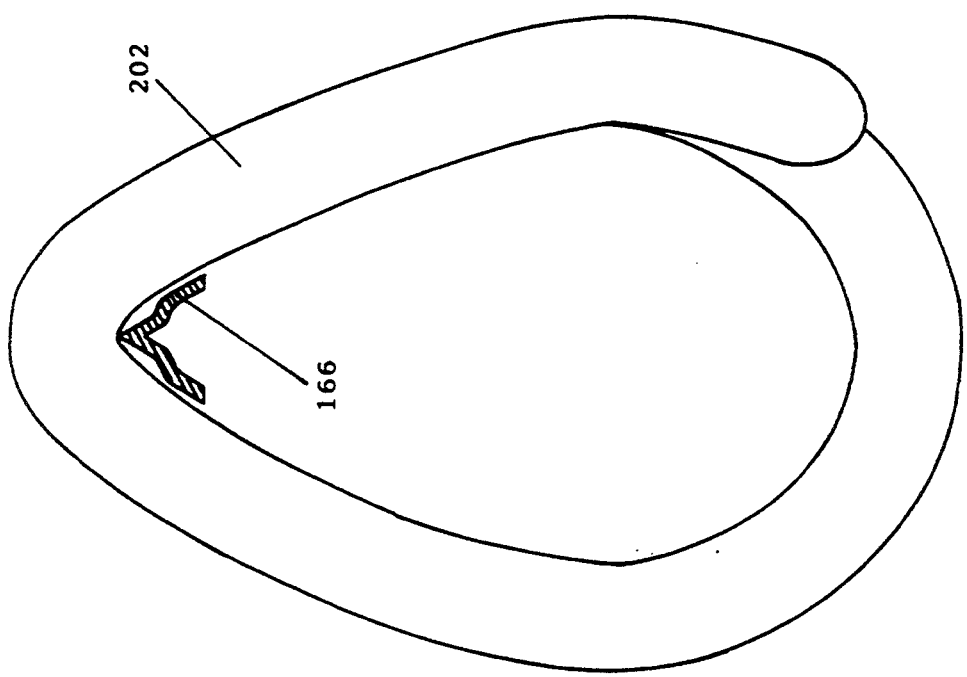
FIG. 23 is an end view of the removed sausage hanging freely from the support.

FIG. 23 shows sausage 202 supported by support 166 with barrel assembly 6 completely withdrawn. FIG. 23 is essentially an end view of the sausage in the position shown in FIG. 19. The loops of sausage 202 have a generally teardrop shape when viewed from the end, as shown in FIG. 23.

Figure 24:
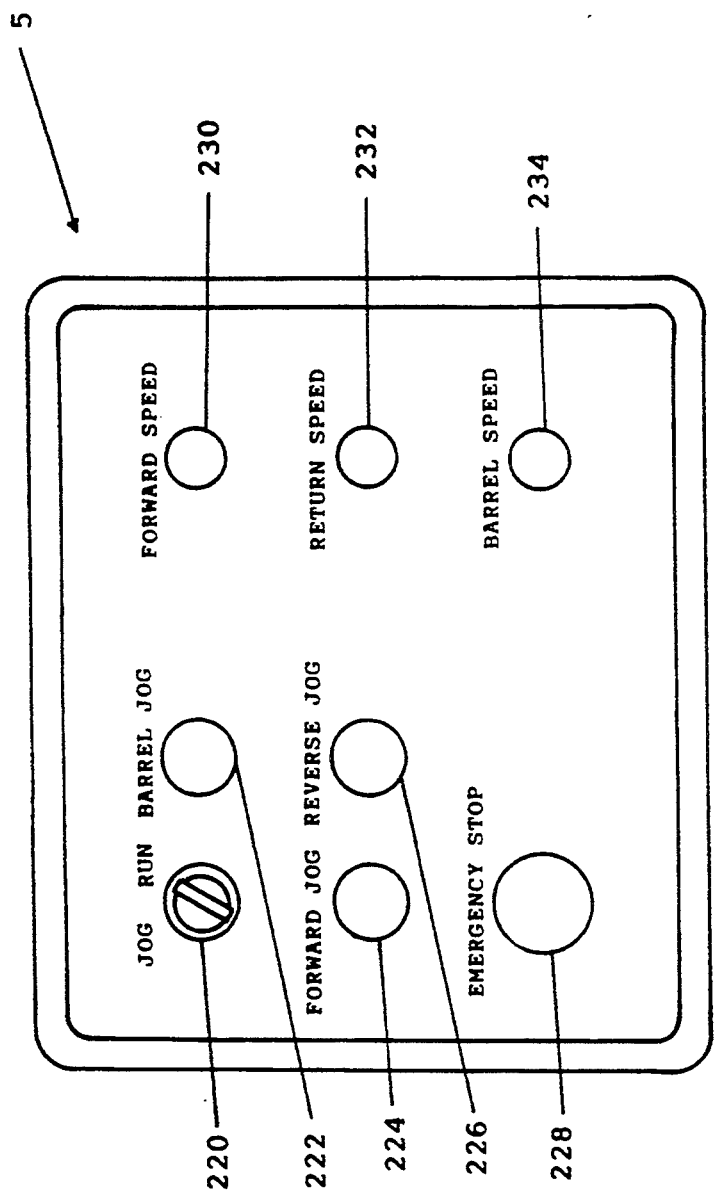
FIG. 24 is an enlarged view of the control panel.

The process just described in reference to FIGS. 16–23 is implemented and controlled by the PLC which is pre-programmed to carry out this process. Referring to FIG. 24, control panel 5 is shown. Switch 220 allows the operator to select between the run mode of operation, in which device 2 will. function as described, and the jog mode of operation. In the jog mode, the rotation and lateral movement of barrel assembly 6 may be controlled individually. For example, in the jog mode, barrel assembly 6 will rotate whenever button 222 is depressed. Similarly, barrel assembly will move laterally forward (to the left in FIG. 1) when button 224 is depressed, and laterally reverse (to the right in FIG. 1) whenever button 226 is depressed. If emergency stop button 228 is depressed, the entire device will shut off, including the vacuum.

Also shown on control panel 5, are adjustments for the forward speed, return speed and barrel rotational speed. Potentiometers 230, 232 and 234 may be used to control these speeds respectively. These potentiometers are used to set up the machine for its operation in the run mode.

In summary, numerous benefits have been described which result from employing the concepts of the present invention. The device provides an automatic way to coil food casings, and in particular sausages, around a support for subsequent processing. The device minimizes the physical labor required of the operator, thereby reducing strenuous, repetitive movements which can result in long-term injury.

Various modifications of the present invention are possible, which are within the scope of this invention. One possible modification is the integration of device 2 with the food stuffing horn (not illustrated). The food horn may be located adjacent the workstation such that the food casing is stuffed, automatically picked up by/-secured to the end of the barrel assembly and wrapped around the barrel assembly in a continuous single process. In such a single process, the rotational and lateral speeds of the barrel assembly would be selected to match the food stuffing speed of the food horn. It is contemplated that it would be necessary to provide a different rotational home position so that the recessed region 100 can be properly aligned with the food stuffing horn. It is for this purpose that proximity pickup 162 has been incorporated in the present preferred embodiment, anticipating such a future integration of the processes.

It is noted that various other modifications may be made without departing from the spirit of the invention. Other types of drive mechanisms and controls may be utilized. For example, the rotation and lateral movement of the barrel assembly may be controlled by a single drive mechanism which is mechanically linked together. In such a case, an adjustable ratio between the two speeds would be desirable. It is possible to change the configuration of the support to provide increased friction between the support and the food casing so as to enhance the removal of the food casing from the barrel assembly. It is also noted that various cross-sectional shapes and configurations of the barrel assembly or its equivalents may be used. It may be possible to move the workstation/feeding station while maintaining the barrel assembly stationary. It may be possible to move the workstation/feeding station about a non-rotating barrel assembly. The support may be moved laterally to pick up the food casing.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A device for arranging a flexible foodstuff casing located at a work station onto a support, comprising:
   (a) a first member having an axis of rotation and having a first effective perimeter for supporting the flexible casing;
   (b) first means for selectively rotating said member about said axis of rotation;
   (c) second means for selectively providing relative movement between said first member and the support in a first predetermined direction; and
   (d) third means for transferring the flexible casing from said first member onto the support, said third means comprising means for reducing said effective perimeter of said first member to a second effective perimeter which is less than said first effective perimeter.

2. The device of claim 1 wherein said means for reducing the effective perimeter comprises said first member including a plurality of contact locations for supporting the flexible casing, said plurality of contact locations being moveable between a first arrangement of positions relative to each other which define said first effective perimeter and a second arrangement of positions relative to each other which define said second effective perimeter.

3. The device of claim 1 wherein said first member comprises a body and at least one door, and wherein said means for reducing the effective perimeter comprises said at least one door being pivotably connected to said body and moveable between said first and second positions.

4. The device of claim 1 wherein said device includes means for selectively securing at least a portion of the flexible casing when said first member is rotating so that the flexible casing can be arranged around said first member.

5. The device of claim 4 wherein said securing means comprises means for releasably securing at least a portion of the flexible casing to said first member.

6. The device of claim 5 wherein said securing means includes a passageway associated with said first member, said passageway communicating with at least one opening and being connectable to a source of vacuum, whereby the flexible casing can be releasably secured to said first member when a vacuum is present in said passageway.

7. A device for arranging a flexible foodstuff casing located at a work station onto a support, comprising:
   (a) a first member, said first member being rotatable with respect to the work station;
   (b) first means for selectively rotating said member with respect to the work station;
   (c) second means for selectively providing relative movement between said first member and the work station in a first predetermined direction; and
   (d) third means for transferring the flexible casing from said first member onto the support.

8. The device of claim 7 wherein said first member has a first effective perimeter for supporting the flexible casing and wherein said third means comprises means for reducing said effective perimeter of said first member to a second effective perimeter which is less than said first effective perimeter.

9. The device of claim 8 wherein said means for reducing the effective perimeter comprises said first member including a plurality of contact locations for supporting the flexible casing, said plurality of contact locations being moveable between a first arrangement of positions relative to each other which define said first effective perimeter and a second arrangement of positions relative to each other which define said second effective perimeter.

10. The device of claim 8 wherein said first member comprises a body and at least one door, and wherein said means for reducing the effective perimeter comprises said at least one door being pivotably connected to said body and moveable between said first and second positions.

11. The device of claim 7 wherein said device includes means for selectively securing at least a portion of the flexible casing when said first member is rotating so that the flexible casing can be arranged around said first member.

12. The device of claim 11 wherein said securing means comprises means for releasably securing at least a portion of the flexible casing to said first member.

13. The device of claim 12 wherein said securing means includes a passageway associated with said first member, said passageway communicating with at least one opening and being connectable to a source of vacuum, whereby the flexible casing can be releasably secured to said first member when a vacuum is present in said passageway.

14. The device of claim 9 wherein said second means comprises means for moving said first member relative to the support.

15. A method for arranging a flexible foodstuff casing on a support, comprising the steps of:
   (a) providing the flexible casing at a work station;
   (b) securing at least a portion of the flexible casing so that the flexible casing can be arranged around a first member when said first member is rotating, said first member having a first effective perimeter for supporting the flexible casing;
   (c) rotating said first member relative to said work station;
   (d) arranging the non-secured portion of the flexible casing around said first member while said first member rotates relative to said work station such that the flexible casing is adjacent said first effective perimeter;
   (e) moving said first member relative to the support in a first predetermined direction; and
   (f) transferring the flexible casing from said first member to the support.

16. The method according to claim 15 wherein said transferring step comprising the step of reducing the effective perimeter of said first member from said first effective perimeter to a second effective perimeter which is less than said first effective perimeter.

17. The method according to claim 15 wherein said securing step comprises the step of securing said portion of the flexible casing to said first member.

18. The method according to claim 15 wherein said transferring step includes the step of releasing said secured portion of said flexible casing.

* * * * *

UNITED STATES PATENT AND TRADEMARK OFFICE
CERTIFICATE OF CORRECTION

PATENT NO.  : 5,372,537
DATED       : December 13, 1994
INVENTOR(S) : Michael F. Stiles It is certified that error appears in the above-indentified patent and that said Letters Patent is hereby corrected as shown below:

Column 12, line 14, (Claim 14), "claim 9" should read --claim 7--

Signed and Sealed this

Thirtieth Day of May, 1995

*Attest:*

BRUCE LEHMAN

*Attesting Officer*     *Commissioner of Patents and Trademarks*